US011878577B2

(12) United States Patent
Engerman

(10) Patent No.: US 11,878,577 B2
(45) Date of Patent: *Jan. 23, 2024

(54) ELECTRIC DRIVE AXLE WITH MULTI-SPEED GEARBOX

(71) Applicant: Dana Automotive Systems Group, LLC, Maumee, OH (US)

(72) Inventor: Eric M. Engerman, Novi, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/455,819

(22) Filed: Nov. 19, 2021

(65) Prior Publication Data

US 2022/0072941 A1    Mar. 10, 2022

Related U.S. Application Data

(63) Continuation of application No. 16/966,858, filed as application No. PCT/US2018/028918 on Apr. 23, 2018, now Pat. No. 11,207,962.

(Continued)

(51) Int. Cl.
*B60K 17/06* (2006.01)
*B60K 1/00* (2006.01)
(Continued)

(52) U.S. Cl.
CPC .............. *B60K 1/00* (2013.01); *B60K 17/06* (2013.01); *F16D 13/52* (2013.01);
(Continued)

(58) Field of Classification Search
CPC ........ B60K 1/00; B60K 17/06; B60K 17/354; B60K 17/356; B60K 2001/001;
(Continued)

(56) References Cited

U.S. PATENT DOCUMENTS 3,063,529 A * 11/1962 Cook ...................... F16D 23/06
192/53.5
3,645,153 A   2/1972 Northcraft
(Continued)

FOREIGN PATENT DOCUMENTS

CN    105299153 A    2/2016
CN    106090173 A    11/2016

OTHER PUBLICATIONS

ISA European Patent Office, International Search Report and Written Opinion Issued in Application No. PCT/US2018/028918, dated Nov. 15, 2018, WIPO, 17 pages.

*Primary Examiner* — Timothy Hannon
*Assistant Examiner* — Farhana Pervin
(74) *Attorney, Agent, or Firm* — McCoy Russell LLP

(57) ABSTRACT

An electric drive axle including a first shaft in driving engagement with an electric motor. A first gear and a second gear are coupled with the first shaft. A second shaft is disposed offset from the first shaft. A third gear is selectively coupled with the second shaft, and the third gear is meshed with the first gear. A fourth gear is selectively coupled with the second shaft, and the fourth gear is meshed with the second gear. A fifth gear is coupled with the second shaft and meshed with a sixth gear coupled with a differential case.

19 Claims, 11 Drawing Sheets

Related U.S. Application Data

(60) Provisional application No. 62/625,920, filed on Feb. 2, 2018.

(51) Int. Cl.

| | | |
|---|---|---|
| *F16D 13/52* | (2006.01) | |
| *F16D 25/0638* | (2006.01) | |
| *F16D 25/10* | (2006.01) | |
| *F16H 3/089* | (2006.01) | |
| *F16H 37/04* | (2006.01) | |
| *F16H 57/037* | (2012.01) | |
| *F16H 63/30* | (2006.01) | |
| *F16H 57/02* | (2012.01) | |

(52) U.S. Cl.
CPC ......... *F16D 25/0638* (2013.01); *F16D 25/10* (2013.01); *F16H 3/089* (2013.01); *F16H 37/042* (2013.01); *F16H 57/037* (2013.01); *F16H 63/3026* (2013.01); *B60K 2001/001* (2013.01); *F16H 2057/02034* (2013.01); *F16H 2057/02052* (2013.01); *F16H 2200/0021* (2013.01); *F16H 2200/0034* (2013.01); *F16H 2702/04* (2013.01)

(58) Field of Classification Search
CPC ...... F16D 13/52; F16D 25/0638; F16D 25/10; F16H 3/089; F16H 37/042; F16H 57/037; F16H 63/3026; F16H 2057/02034; F16H 2057/02052; F16H 2200/0021; F16H 2200/0034; B60Y 2400/424
See application file for complete search history.

(56) References Cited

U.S. PATENT DOCUMENTS

| | | |
|---|---|---|
| 5,735,376 A | 4/1998 | Moroto et al. |
| 9,874,278 B2 | 1/2018 | Toyota et al. |
| 2008/0142331 A1* | 6/2008 | Miyazaki ............... F16D 25/123 192/70.12 |
| 2012/0316023 A1 | 12/2012 | Bausch et al. |
| 2013/0296129 A1 | 11/2013 | Itakura et al. |
| 2013/0305861 A1 | 11/2013 | Ruehle et al. |
| 2014/0004987 A1 | 1/2014 | Sato et al. |
| 2014/0033844 A1 | 2/2014 | Rothvoss et al. |
| 2014/0204940 A1 | 7/2014 | Bestler et al. |
| 2015/0375750 A1 | 12/2015 | Toyota et al. |
| 2016/0003326 A1 | 1/2016 | Park et al. |
| 2016/0017958 A1 | 1/2016 | Wu et al. |
| 2017/0120891 A1* | 5/2017 | Kishimoto ............. B60L 50/61 |
| 2017/0152921 A1* | 6/2017 | Ikemura ................. F16H 3/666 |
| 2017/0175863 A1 | 6/2017 | Kramer et al. |
| 2017/0204940 A1 | 7/2017 | Tseng et al. |
| 2017/0204941 A1 | 7/2017 | Tseng et al. |
| 2019/0047415 A1* | 2/2019 | Han ....................... B60K 23/02 |
| 2019/0178307 A1* | 6/2019 | Garrett ................ F16D 25/0638 |

* cited by examiner

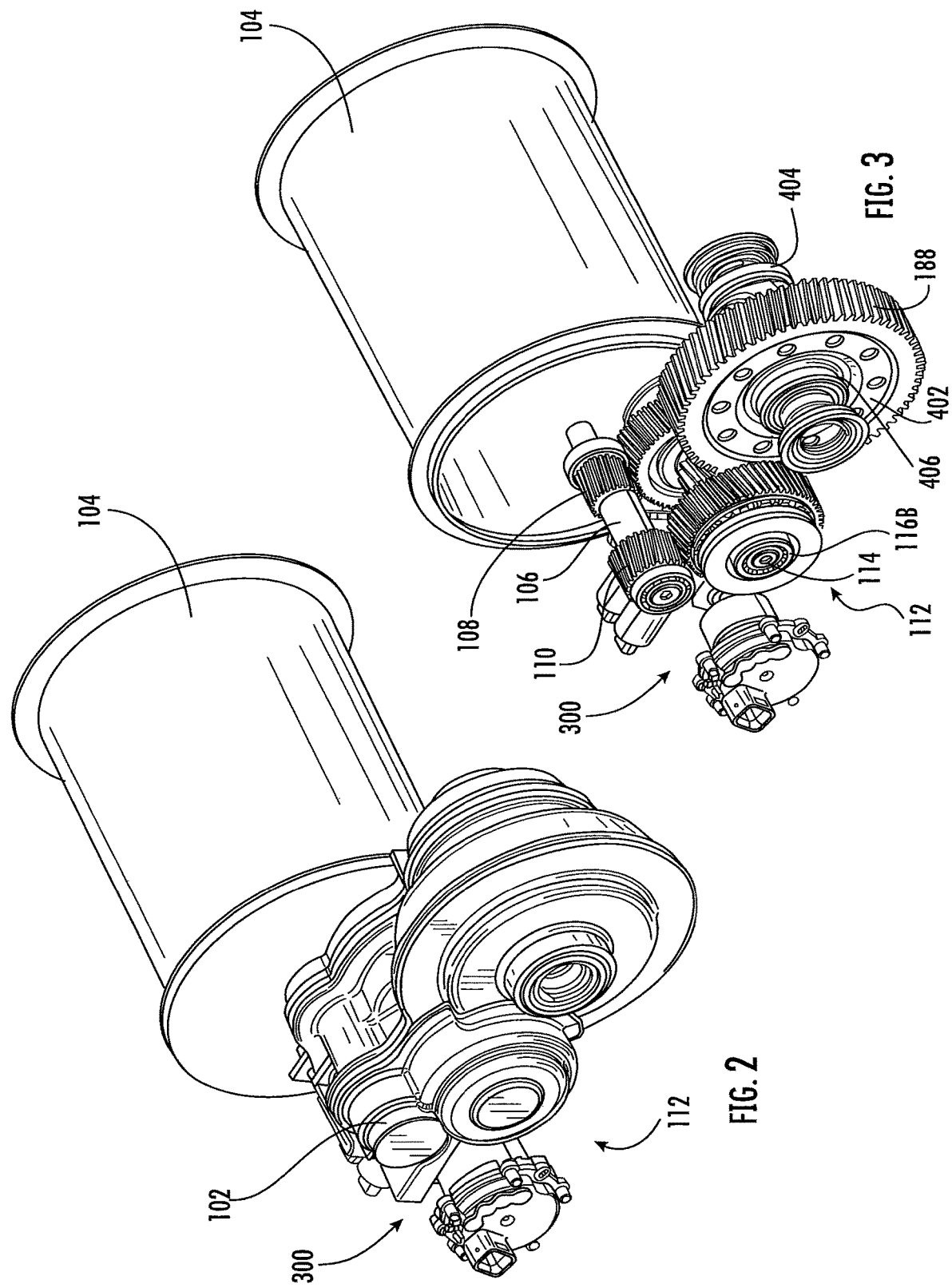

ELECTRIC DRIVE AXLE WITH MULTI-SPEED GEARBOX

CROSS-REFERENCE TO RELATED APPLICATIONS

The present application is a Continuation of U.S. National Phase application Ser. No. 16/966,858, entitled "ELECTRIC DRIVE AXLE WITH MULTI-SPEED GEARBOX" and filed Jul. 31, 2020 U.S. application Ser. No. 16/966,858 is a National Phase of International Application PCT/US2018/028918, entitled "ELECTRIC DRIVE AXLE WITH MULTI-SPEED GEARBOX," filed on Apr. 23, 2018. International Patent Application Serial No. PCT/US2018/028918 claims priority to U.S. Provisional Application No. 62/625,920, filed on Feb. 2, 2018. The entire contents of each of the above-mentioned applications are hereby incorporated by reference in their entirety for all purposes.

BACKGROUND

The present disclosure relates to gearboxes and electric drive axles. Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

However, in order for the conventional electric vehicle to achieve sufficient speed, the electric motor must allow for reasonable power over a broad speed range. An electric motor which can provide reasonable power over a broad speed range is typically large and heavy.

In view of the above, there remains a need for an electric drive axle having reduced size, weight, and production costs.

SUMMARY

The present disclosure provides for an electric drive axle. In one embodiment, an electric drive axle includes a first shaft in driving engagement with an electric motor. A first gear and a second gear are coupled with the first shaft. A second shaft is disposed offset from the first shaft. A third gear is selectively coupled with the second shaft, and the third gear is meshed with the first gear. A fourth gear is selectively coupled with the second shaft, and the fourth gear is meshed with the second gear. A fifth gear is coupled with the second shaft and meshed with a sixth gear coupled with a differential case. The electric drive axles further includes a first clutch disposed at least partially concentrically within said second gear or said third gear and a first fluid conduit disposed at least partially through the first shaft or the second shaft and in fluid communication with a clutch drum in the first clutch.

In another embodiment, an electric drive axle includes an electric motor and a first shaft in driving engagement with the electric motor. A first gear is coupled with the first shaft, and a second gear is selectively coupled with the first shaft. A second shaft is disposed offset from the first shaft. A third gear selectively coupled with the second shaft, wherein the third gear is meshed with the first gear. A fourth gear is coupled with the second shaft, wherein the fourth gear is meshed with the second gear. A fifth gear is coupled with said second shaft and meshed with a sixth gear coupled with a differential case. The electric drive axle further includes a first clutch disposed at least partially concentrically within said second gear.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 2 illustrates a portion of an electric drive axle of the driveline according to FIG. 1;

FIG. 3 illustrates a portion of an electric drive axle according to FIG. 2;

DETAILED DESCRIPTION

Figure 1:
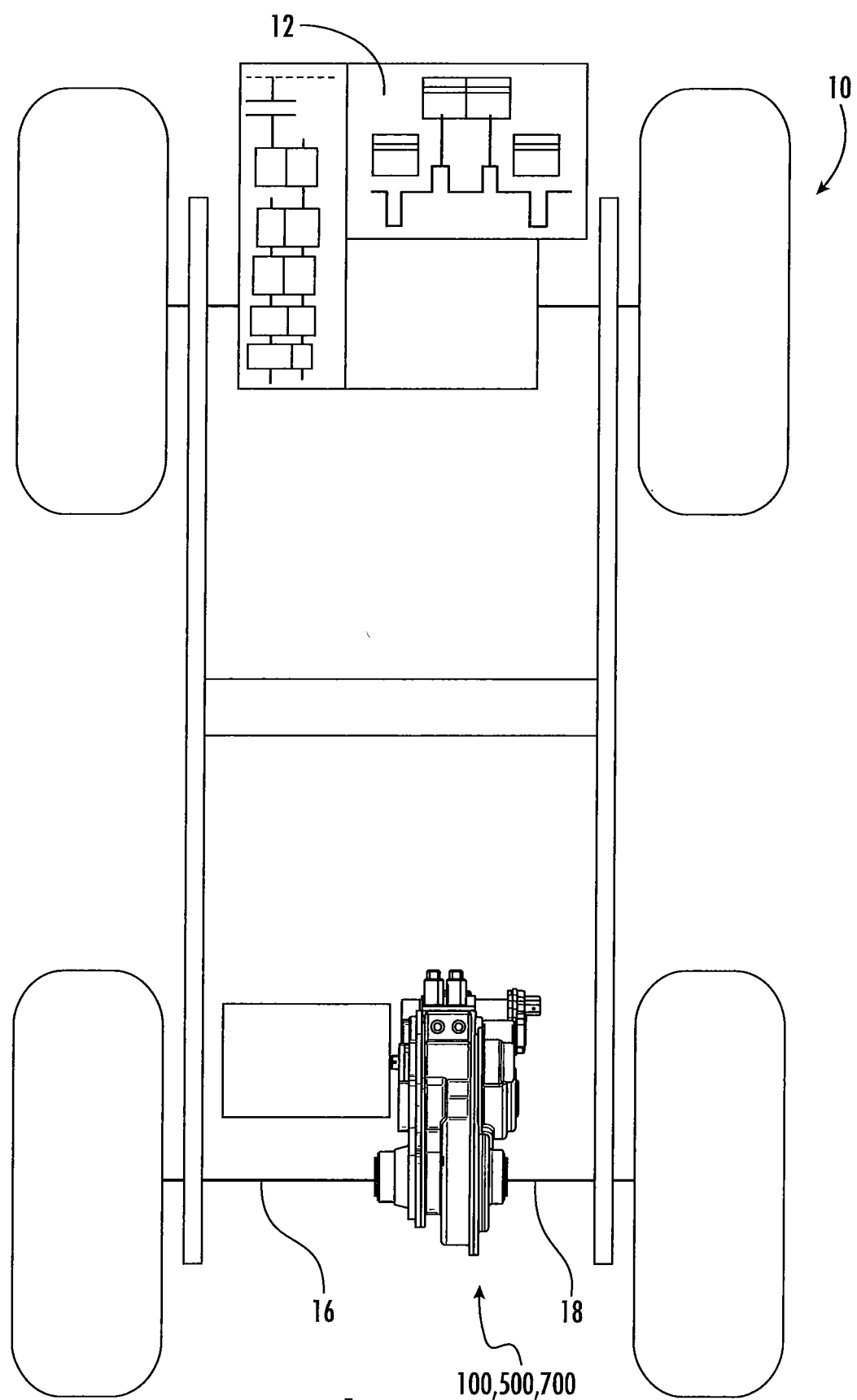
FIG. 1 illustrates a schematic diagram of a vehicle driveline according to an embodiment of the presently disclosed subject matter.
Figure 5:
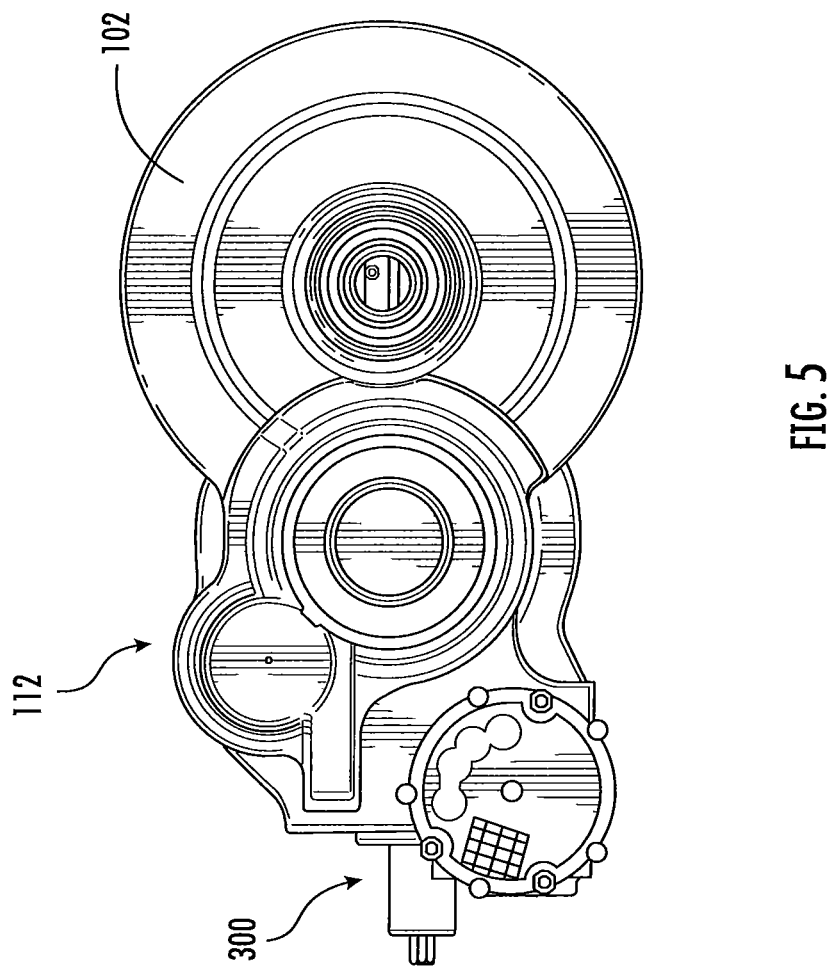
FIG. 5 illustrates a portion of an electric drive axle of the driveline according to FIG. 1.
Figure 4:
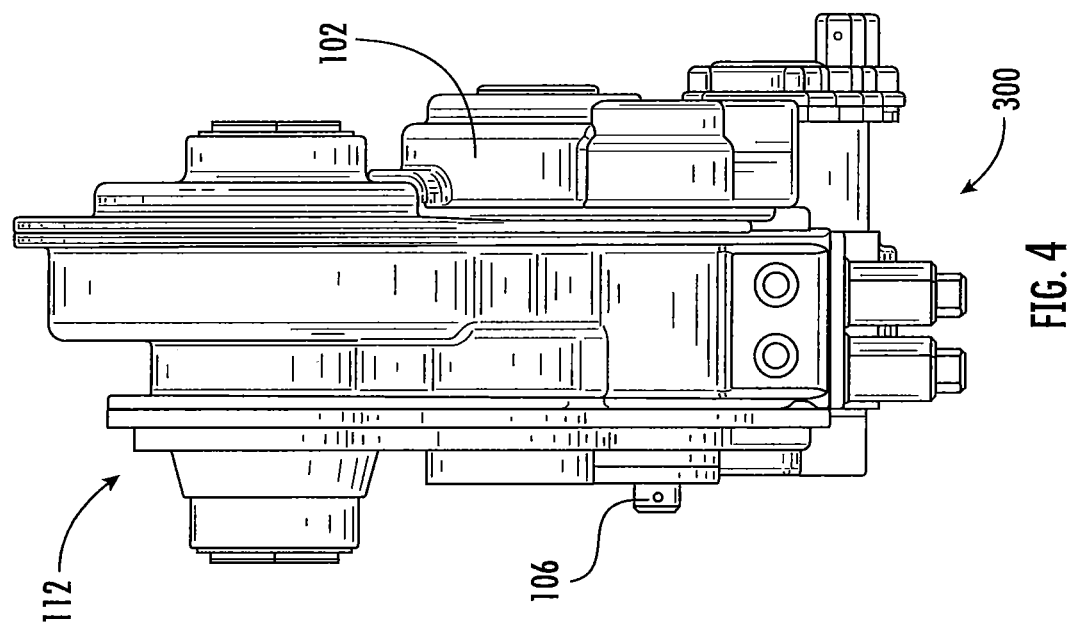
FIG. 4 illustrates a portion of an electric drive axle of the driveline according to FIG. 1.
Figure 6:
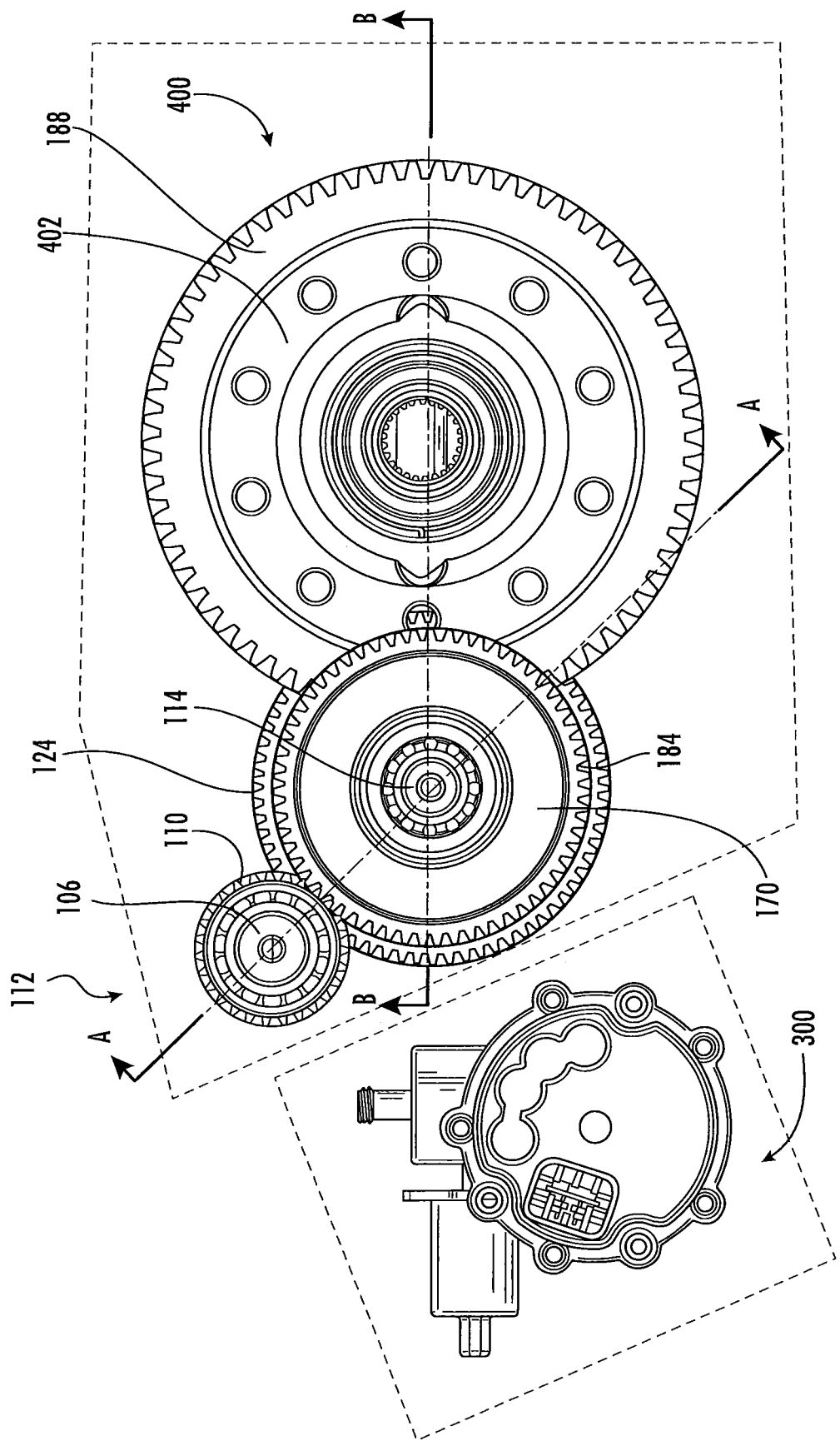
FIG. 6 illustrates a portion of an electric drive axle of the driveline according to FIG. 1.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle 100 are described below. In certain embodiments, the electric drive axle 100 is utilized with a pure electric vehicle (not depicted) where the electric drive axle 100 is the only driving axle. In other embodiments, as illustrated in FIG. 1, the electric drive axle is utilized with a hybrid all-wheel-drive vehicle 10, where the front axle is driven by an internal combustion engine 12, and the rear axle is the electric drive axle 100. In still other embodiments, the electric drive axle 100 is utilized in a hybrid commercial vehicle (not depicted) comprising a tandem axle in which the front tandem axle is driven by an internal combustion engine, and the rear tandem axle is the electric drive axle 100 (or vice versa). The electric drive axle 100 may have applications in commercial vehicles, both light duty and heavy-duty vehicles, and for passenger, off-highway, and sport utility vehicles. Additionally, the electric drive axle 100 described herein may be adapted for use in front and/or rear driving axles, and in steerable and non-steerable axles. It would be understood by one of ordinary skill in the art that the electric drive axle 100 also has industrial, locomotive, military, agricultural, and aerospace applications.

As illustrated in FIGS. 2 and 3, in an embodiment, the electric drive axle 100 may comprise an integrated drive system. In an embodiment, the electric drive axle 100 includes an electric motor 104 coupled with a power source (not depicted). The electric motor 104 may be a permanent magnet synchronous machine comprising a stator (not depicted) disposed concentrically about a rotor (not depicted). The electric drive axle 100 may additionally comprise an inverter (not depicted) for converting direct current to alternating current when the electric motor 104 is utilized to drive the vehicle, and for converting alternating current to direct current when the vehicle 10 decelerates. The electric motor 104 may be referred to herein as a motor-generator. Further, the electric drive axle 100 may include cooling fluid (not depicted) such as, but not limited to, automatic transmission fluid or axle oil integrated with the electric drive axle 100 lubricant for cooling the electric motor 104 and the inverter. In another embodiment (not depicted), the cooling fluid for the electric motor 104 and the inverter may not be integrated with the axle oil.

A motor output shaft 106 is coupled with the rotor of the electric motor 104 for rotation therewith. A first gear 108 and a second gear 110 are coupled with the motor output shaft 106 for rotation therewith. In an embodiment, the first and second gears 108, 110 are forged on the motor output shaft 106. In another embodiment, the first and second gears 108, 110 may be welded to the motor output shaft 106. In still another embodiment, the first and second gears 108, 110 may be splined to the motor output shaft 106. The electric motor 104 drives a compound idler assembly 112 via the motor output shaft 106 and the first and second gears 108, 110. In an embodiment, the motor output shaft 106, the compound idler assembly 112, and axle shafts 16, 18 are disposed offset and parallel relative to one another.

As illustrated in FIGS. 4-8, the compound idler assembly 112 comprises an idler shaft 114 rotatably supported in an axle housing 102 via first and second bearings 116A, 116B. The idler shaft 114 comprises a first portion 118, a second portion 120, a third portion 122A, and a fourth portion 122B. The first and second portions 118, 120 may be disposed at opposing ends of the idler shaft 114 and have the same diameter. The idler shaft third and fourth portions 122A, 122B may be disposed axially between the first and second portions 118, 120, and the diameter of the first and second portions 118, 120 may be smaller than a diameter of the third and fourth portions 122A, 122B. The first bearing 116A is disposed concentrically about the idler shaft first portion 118, and the second bearing 116B is disposed concentrically about the idler shaft second portion 120. In an embodiment, the idler shaft third and fourth portions 122A, 122B may be splined.

Figure 8:
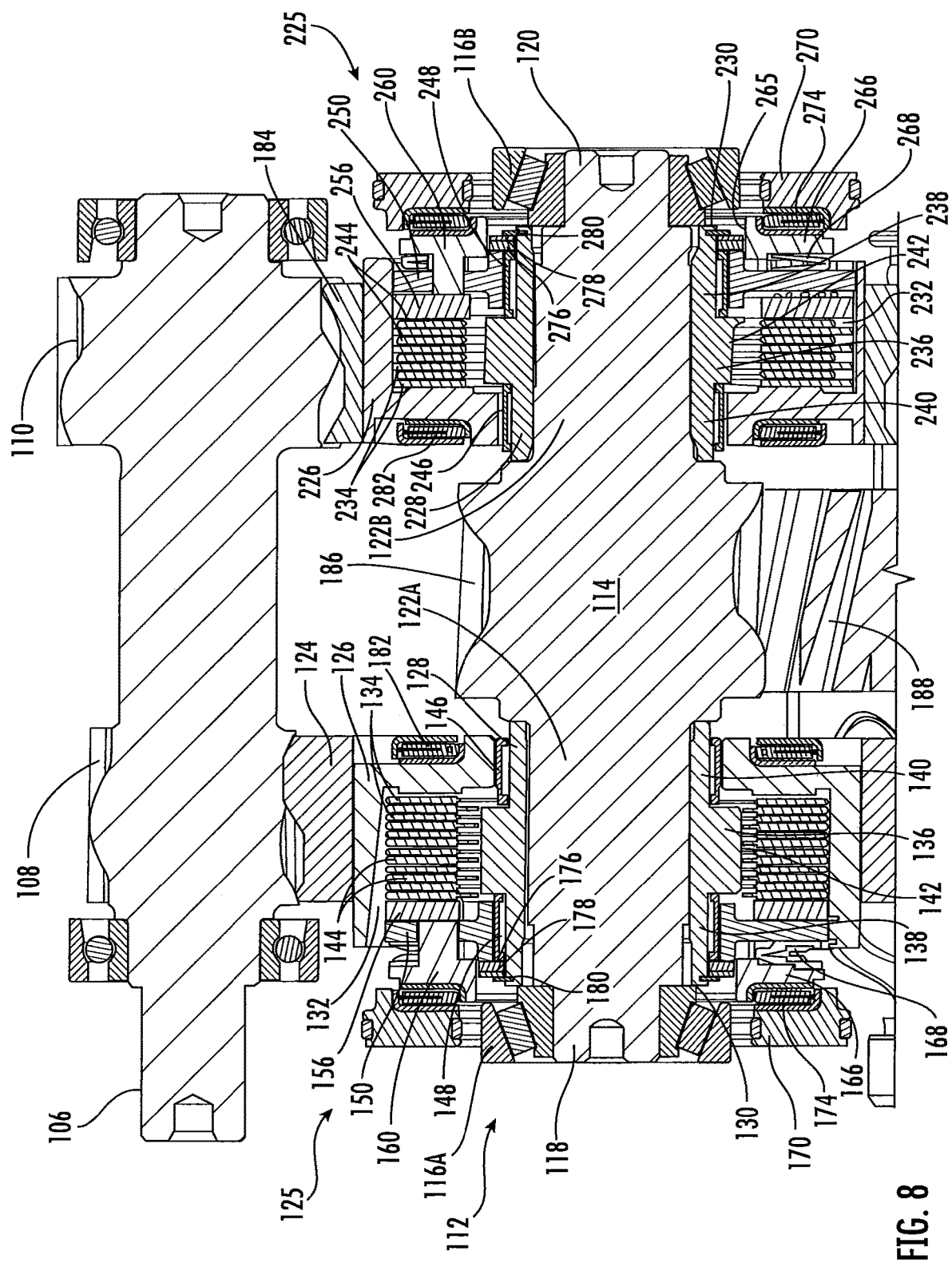
FIG. 8 illustrates a cross-sectional view of the electric drive axle according to FIG. 6 along line A-A.

A third gear 124 is disposed concentrically about at least a portion of the idler shaft third portion 122A. The third gear 124 is in meshed engagement with the first gear 108 and receives torque therefrom when the electric motor 104 outputs torque to the motor output shaft 106. The third gear 124 comprises the general geometry of a hollow right circular cylinder. The third gear 124 is part of a first clutch assembly 125. As illustrated in FIG. 8, in an embodiment, the first clutch assembly 125 comprises a first clutch drum 126 disposed at least partially concentrically within the third gear 124. A radially outer surface of the first clutch drum 126 is coupled with a radially inner surface of the third gear 124. In an embodiment, the first clutch drum 126 and the third gear 124 may be coupled via splined engagement. In another embodiment, the first clutch drum 126 and the third gear 124 may be coupled via an interference fit. In yet another embodiment (not depicted), the third gear 124 and the clutch drum 126 may comprise a unitary component.

A first clutch hub 128 is disposed at least partially concentrically within the first clutch drum 126. The first clutch hub 128 may comprise a splined radially inner surface in meshed engagement with complimentary splines on the idler shaft third portion 122A. A first axially outer surface 130 of the first clutch hub 128 abuts the first bearing 116A. The third gear 124 is entirely supported on the idler shaft 114 by the first clutch hub 128 via the first clutch drum 126.

The first clutch drum 126 comprises a plurality of radially inward extending splines 132 defined on a radially inner surface thereof. The first clutch drum splines 132 may extend the axial length of the radially inner surface of the first clutch drum 126. A first plurality of clutch plates 134 are in meshed engagement with the first clutch drum splines 132. The clutch plates 134 receive torque from the first clutch drum 126 and may move axially within the first clutch drum 126.

The first clutch hub 128 comprises a first portion 136, a second portion 138, and a third portion 140. The first portion 136 defines a plurality of axially extending splines 142. The second and third portions 138, 140 are disposed on either axial side of the first portion 136, respectively. A second plurality of clutch plates 144 are in meshed engagement with the first clutch hub splines 142. The second plurality of clutch plates 144 are interleaved with the first plurality of clutch plates 134. The second plurality of clutch plates 144 may move axially along the first clutch hub splines 142.

Figure 10:
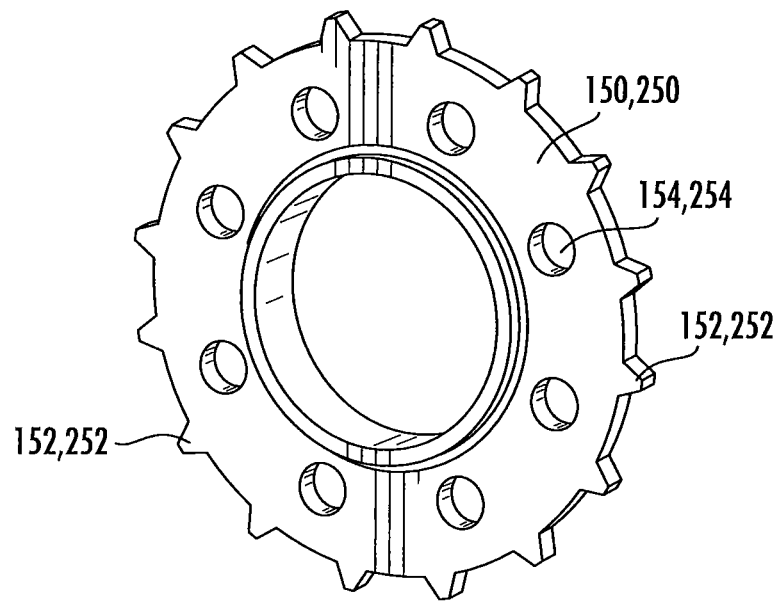
FIG. 10 illustrates a portion of the electric drive axle according to FIG. 8.

In an embodiment, a first needle bearing 146 is disposed about and coupled with the first clutch hub third surface 240. The first needle bearing 146 provides rotational support of the first clutch drum 126. A second needle bearing 148 is disposed about and coupled with the first clutch hub second surface 138. As illustrated in FIGS. 8 and 10, a first support plate 150 is disposed about and rotationally supported by the second needle bearing 148. In an embodiment, the first support plate 150 comprises a radially outer surface having a plurality of radially projecting splines 152. The splines 152 may also be a plurality of teeth or lugs. The splines 152 mesh with the first clutch drum splines 132. The first support plate 150 further comprises a plurality of axially extending apertures 154 therethrough.

Figure 11:
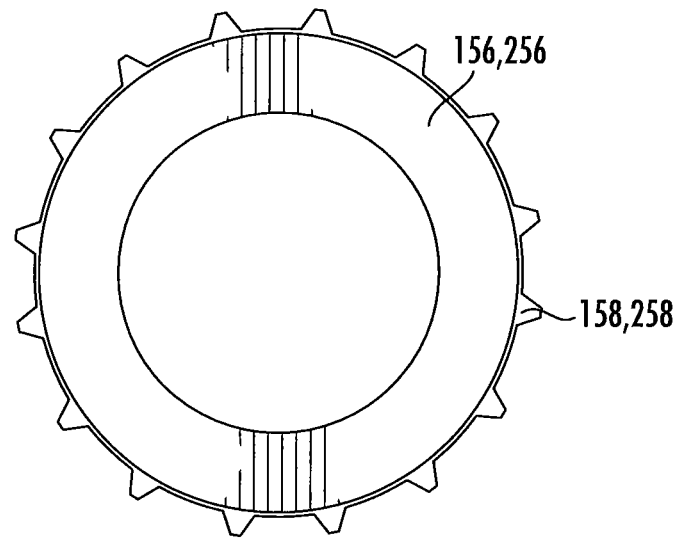
FIG. 11 illustrates another portion of the electric drive axle according to FIG. 8.

As illustrated in FIGS. 8 and 11, a first pressure plate 156 may be disposed axially between the support plate 150 and the plurality of clutch plates 134, 144. The first pressure plate 156 is disposed concentric with the first clutch hub 128. The first pressure plate 156 comprises a plurality of radially extending teeth 158. The teeth 158 may also be referred to herein as splines or lugs. The first pressure plate teeth 158 are meshed with the first clutch drum splines 132.

Figure 12:
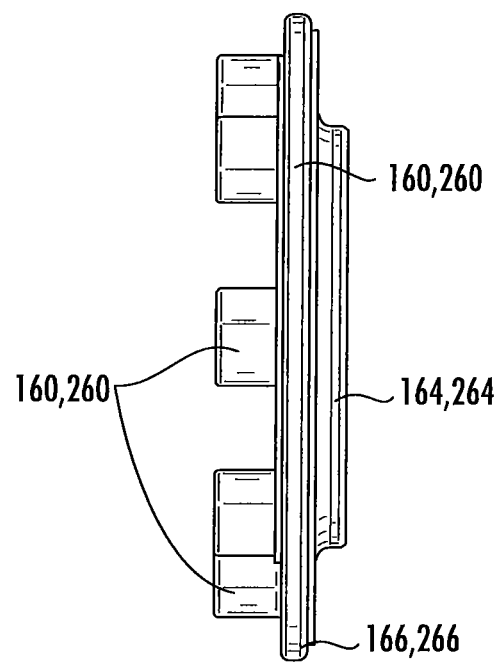
FIG. 12 illustrates still another portion of the electric drive axle according to FIG. 8.

A first apply plate 160 may be disposed at least partially about the first clutch hub 128. As illustrated in FIGS. 8 and 12, in an embodiment, the first apply plate 160 may comprise a plurality of axially projecting lugs 162. The lugs 162 may be disposed through the first support plate apertures 154. The lugs 162 abut a surface of the first pressure plate 156 and apply an axial force thereto during engagement of the plurality of clutch plates 134, 144. The first apply plate also comprises an axially extending flange 164. In an embodiment, the axially extending flange 164 may share a radially inner surface with a surface of the first apply plate 160 having the smallest diameter of the first apply plate 160. The first apply plate 160 may further include a radially extending flange 166. A first biasing member 168 may be disposed axially between the first apply plate radially extending flange 166 and the first support plate 150.

Figure 13:
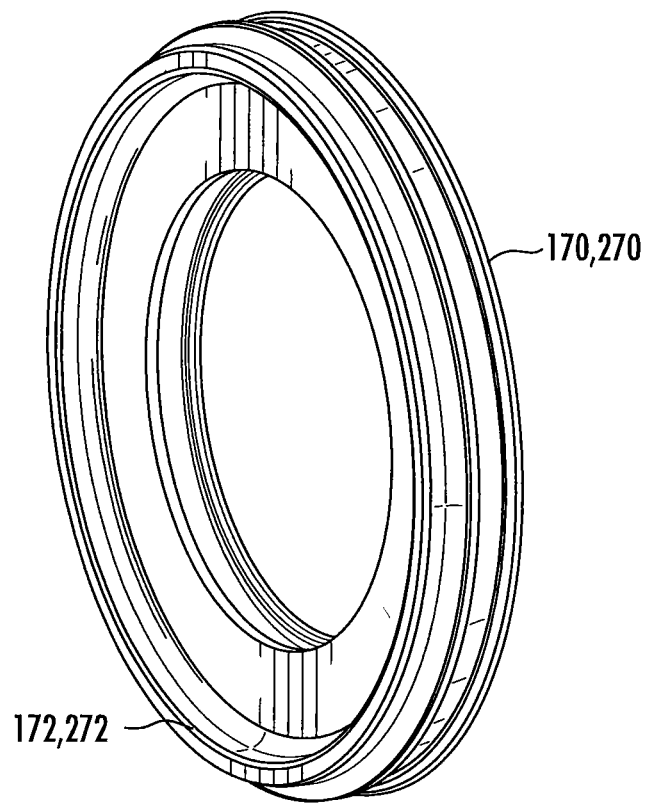
FIG. 13 illustrates yet another portion of the electric drive axle according to FIG. 8.

As illustrated in FIGS. 8 and 13, a first piston member 170 may be disposed at least partially concentrically about said idler shaft 114. The piston member 170 may also be disposed axially adjacent to the first apply plate 160. The first piston member 170 comprises an axially extending flange 172. The axially extending flange 172 protrudes towards the first apply plate 160 when assembled. A first thrust bearing 174 is disposed axially between the first piston member 170 and the first apply plate 160. The first thrust bearing 174 is also disposed at least partially radially between the first piston member axially extending flange 172 and the first apply plate axially extending flange 164.

As illustrated in FIG. 8, a first bushing 176 may be disposed about the first clutch hub second portion 138 adjacent to an end of the second needle bearing 148 that is distal from the first clutch hub first portion 136. The first bushing 176 is also disposed radially within the first apply plate 160. A first shim 178 may be disposed about the first clutch hub second portion 138 adjacent to the first bushing 176. The first shim 178 is also disposed radially within the first apply plate 160. A first snap ring 180 may be disposed at least partially in a groove defined by the first clutch hub second portion 128. The first snap ring 180 is disposed axially adjacent to the first shim 178, and is also disposed radially within the first apply plate 160. Additionally, a second thrust bearing 182 is disposed adjacent to an axially outer surface of the first clutch drum 126 distal from the first apply plate 160.

A fourth gear 184 is disposed concentrically about the idler shaft third portion 122B. The fourth gear 184 is in meshed engagement with the second gear 110 and receives torque therefrom when the electric motor 104 outputs torque to the motor output shaft 106. The fourth gear 184 comprises the general geometry of a hollow right circular cylinder. The fourth gear 184 is part of a second clutch assembly 225. As illustrated in FIG. 8, in an embodiment, the second clutch assembly 225 comprises a second clutch drum 226 disposed at least partially concentrically within the fourth gear 184. A radially outer surface of the second clutch drum 226 is coupled with a radially inner surface of the fourth gear 184. In an embodiment, the second clutch drum 226 and the fourth gear 184 may be coupled via splined engagement. In another embodiment, the second clutch drum 226 and the fourth gear 184 may be coupled via an interference fit. In yet another embodiment (not depicted), the fourth gear 184 and the second clutch drum 226 may comprise a unitary component.

A second clutch hub 228 is disposed concentrically, and at least partially axially, within the second clutch drum 226. The second clutch hub 228 comprises a splined radially inner surface in meshed engagement with complimentary splines on the idler shaft third portion 122A. A first surface 230 of the second clutch hub 228 abuts the first bearing 116A. The fourth gear 184 is entirely supported on the idler shaft 114 by the second clutch hub 228 via the second clutch drum 226.

The second clutch drum 226 comprises a plurality of radially extending splines 232 defined on a radially inner surface thereof. The splines 232 may extend the axial length of the radially inner surface of the second clutch drum 226. A first plurality of clutch plates 234 are in meshed engagement with the second clutch drum splines 232. The clutch plates 234 receive torque from the second clutch drum 226 and may move axially within the second clutch drum 226.

The second clutch hub 228 may comprise a first portion 236, a second portion 238, and a third portion 240. The first portion 236 defines a plurality of axially extending splines 242. The second and third portions 238, 240 are disposed on either axial side of the first portion 236, respectively. A second plurality of clutch plates 244 are in meshed engagement with the second clutch hub splines 242. The second plurality of clutch plates 244 are interleaved with the first plurality of clutch plates 234. The second plurality of clutch plates 244 may move axially along the second clutch hub splines 242.

A third needle bearing 246 is disposed about and coupled with the second clutch hub third surface 240. The third needle bearing 246 provides rotational support of the second clutch drum 226. A fourth needle bearing 248 is disposed about and coupled with the second clutch hub second surface 238. As illustrated in FIGS. 8 and 10, a second support plate 250 is disposed about and rotationally supported by the fourth needle bearing 248. The second support plate 250 comprises a radially outer surface having a plurality of radially projecting splines 252. The splines 252 may also be a plurality of teeth or lugs. The splines 252 mesh with the second clutch drum splines 232. The second support plate 250 further comprises a plurality of axially extending apertures 254 therethrough.

A second pressure plate 256 is disposed axially between the second support plate 250 and the plurality of clutch plates 234, 244. The second pressure plate 256 is disposed concentric with the second clutch hub 228. The second pressure plate 256 comprises a plurality of radially extending teeth 258. The teeth 258 may also be referred to herein as splines or lugs. The second pressure plate teeth 258 are meshed with the second clutch drum splines 232.

A second apply plate 260 is disposed at least partially about the second clutch hub 228. As illustrated in FIGS. 8 and 12, in an embodiment, the second apply plate 260 may comprise a plurality of axially projecting lugs 262. The lugs 262 may be disposed through second support plate apertures 254. The lugs 262 abut a surface of the second pressure plate 256 and apply an axial force thereto during engagement of the plurality of clutch plates 234, 244. The second apply plate 260 also comprises an axially extending flange 264. In an embodiment, the axially extending flange 264 may comprise a radially inner surface having a diameter equal to that of a radially inner surface 265 of the second apply plate 260. The second apply plate 260 may further include a radially extending flange 266. A second biasing member 268 may be disposed axially between the first apply plate radially extending flange 266 and the second support plate 250.

As illustrated in FIGS. 8 and 13, a second piston member 270 is disposed at least partially concentrically about the idler shaft 114. The second piston member 270 is also disposed axially adjacent to the second apply plate 260. The second piston member 270 comprises an axially extending flange 272. The axially extending flange 272 protrudes towards the second apply plate 260 when assembled. A third thrust bearing 274 is disposed axially between the second piston member 270 and the second apply plate 260. The third thrust bearing 274 is also disposed at least partially radially between the second piston member axially extending flange 272 and the second apply plate axially extending flange 264.

As illustrated in FIG. 8, a second bushing 276 may be disposed about the second clutch hub second portion 238 adjacent to an end of the fourth needle bearing 248 distal from the second clutch hub first portion 236. The second bushing 276 is also disposed radially within said second apply plate 260. A second shim 278 may be disposed about the second clutch hub second portion 238 adjacent to the second bushing 276. The second shim 278 is also disposed radially within the second apply plate 260. A second snap ring 280 is disposed at least partially in a groove defined by the second clutch hub second portion 228. The second snap ring 280 is disposed axially adjacent to the second shim 278, and is also disposed radially within the second apply plate 260. Additionally, a fourth thrust bearing 282 is disposed adjacent to an axially outer surface of the second clutch drum 226 distal from the second apply plate 260.

When the first clutch assembly 125 is engaged, the third gear 124 receives torque from the first gear 108 and outputs torque to the idler shaft 114. When the second clutch assembly 225 is engaged, the fourth gear 184 receives torque from the second gear 110 and outputs torque to the idler shaft 114. Only one of the first and second clutch assemblies 125, 225 is engaged at one time during vehicle operation. However, in a parking brake mode, both the first and second clutch assemblies 125, 225 may be engaged simultaneously. The first and second clutch assemblies, 125, 225 also act as support members of the gear train.

Figure 9:
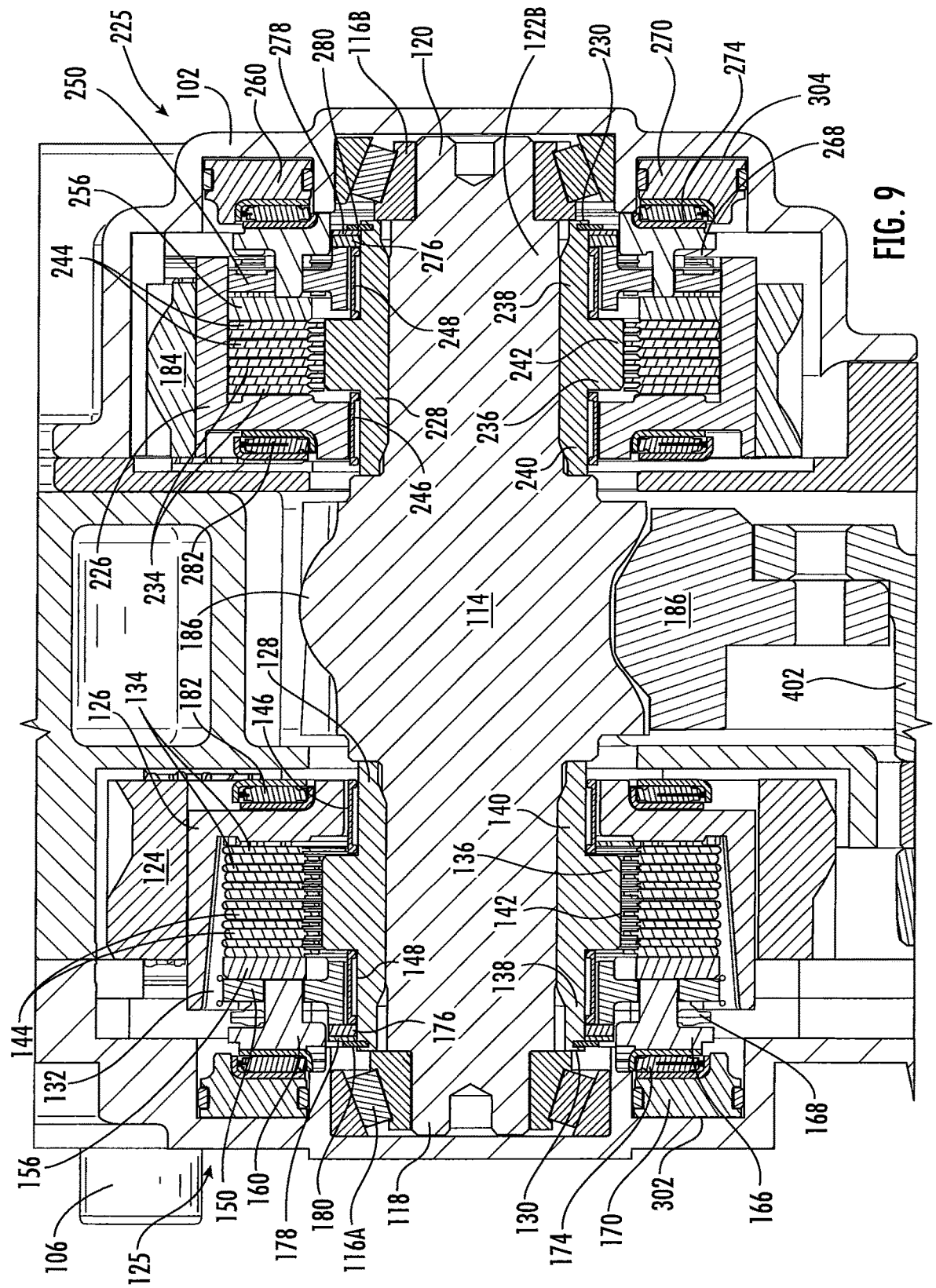
FIG. 9 illustrates a cross-sectional view of the electric drive axle according to FIG. 6 along line B-B.

As illustrated in FIGS. 2-7, the electric drive axle 100 may comprise a hydraulic actuator assembly 300. The hydraulic actuator 300 is in fluid communication with portions 302, 304 of the axle housing 102 (see FIG. 9). The hydraulic actuator 300 utilizes pressurized fluid to actuate the first and second piston members 170, 270 and thereby engage the first and second clutch assemblies 125, 225, respectively.

Figure 7:
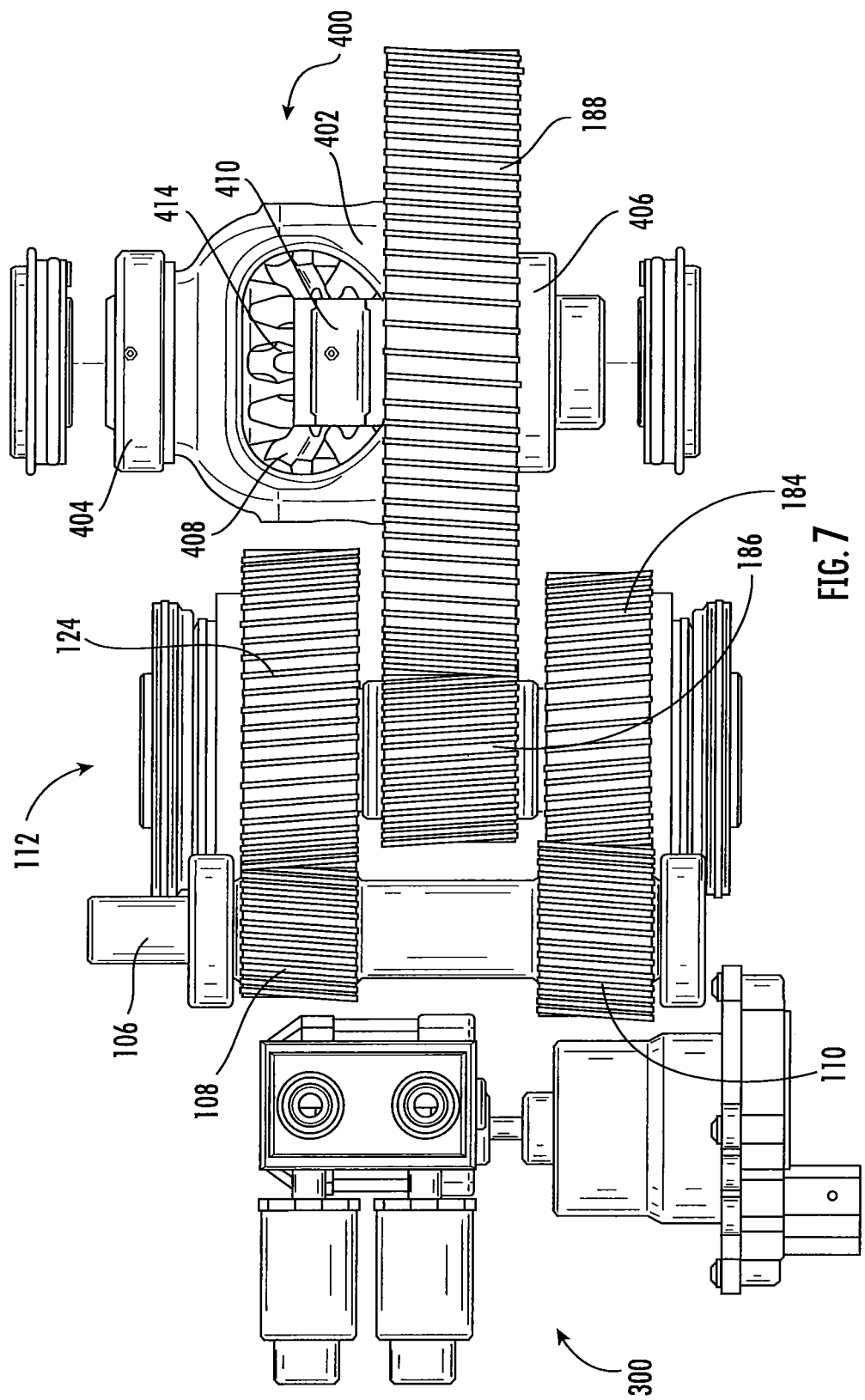
FIG. 7 illustrates a portion of an electric drive axle of the driveline according to FIG. 1 with a housing removed.

As illustrated in FIG. 8, a fifth gear 186 is coupled with the idler shaft 114. In an embodiment, as illustrated in FIG. 8, the fifth gear 186 may be forged on the idler shaft 114. The fifth gear 186 is in meshed engagement with a sixth gear 188. As illustrated in FIG. 7, the sixth gear 188 is coupled with, and fixed for rotation with, a differential case 402. The differential case 402 is part of a differential mechanism 400. The differential case 402 is rotatably supported within the axle housing 102 via a pair of bearings 404, 406. The differential mechanism 400 further includes two or more differential pinions 408. The differential pinions 408 are coupled within the differential case 402 via a pinion shaft 410 (i.e., spider shaft). In an embodiment, the pinion shaft 410 may comprise a cross member. The differential pinions 408 are in meshed engagement with a first side gear 412 and a second side gear (not depicted). The first side gear 412 is coupled for rotation with the first axle shaft 16, and the second side gear is coupled for rotation with the second axle shaft 18.

Figure 14:
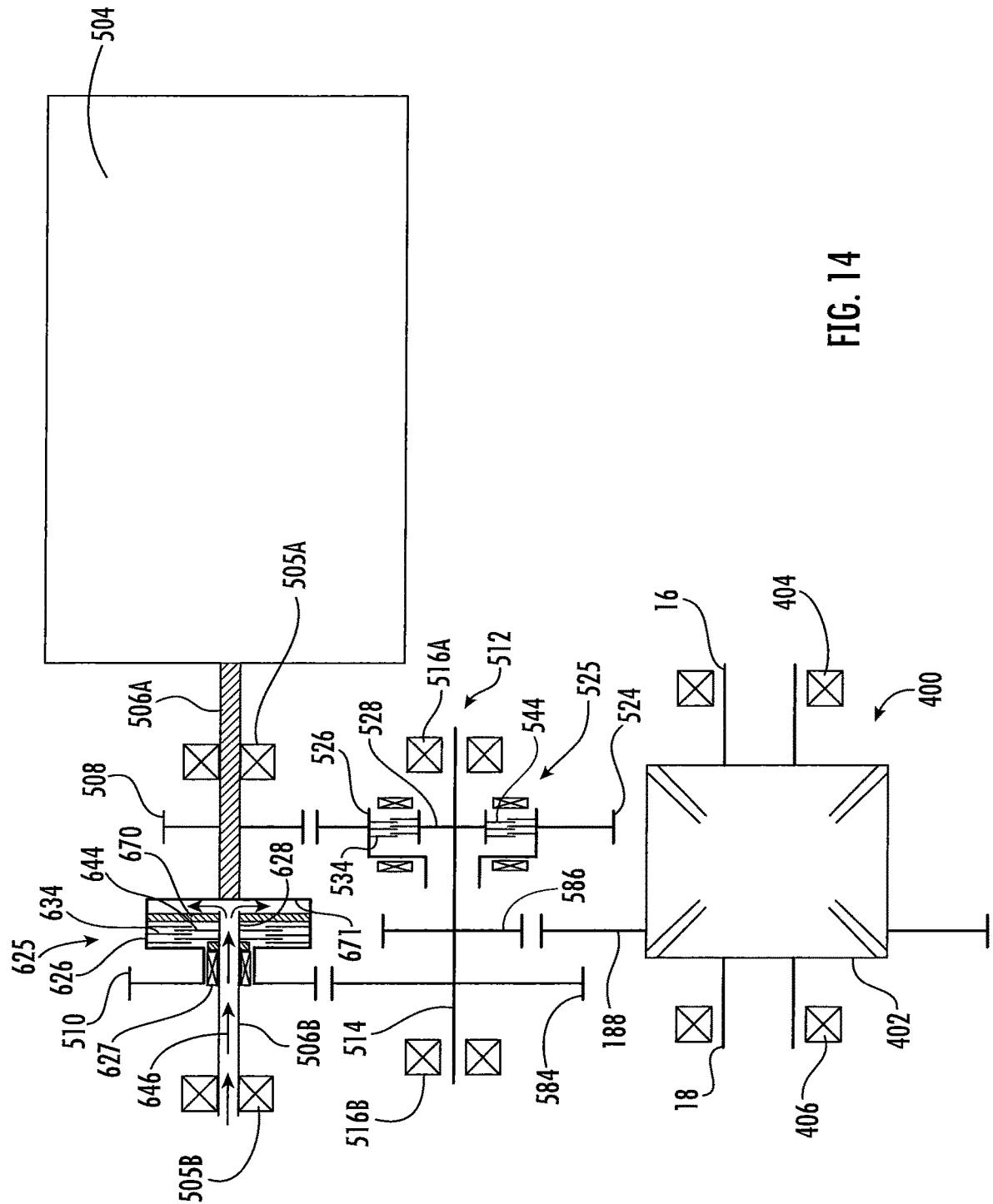
FIG. 14 illustrates a schematic diagram of an electric axle according to an embodiment of the presently disclosed subject matter.

In another embodiment, as illustrated in FIG. 14, an electric drive axle 500 may comprise an electric motor 504 coupled with a power source (not depicted). The electric motor 504 may be a permanent magnet synchronous machine comprising a stator (not depicted) disposed concentrically about a rotor (not depicted). A motor output shaft first portion 506A and second portion 506B are rotatably disposed within a housing (not depicted) via a first bearing 505A and a second bearing 505B. The motor output shaft first portion 506A is coupled with the rotor of the electric motor 504 for rotation therewith. A first gear 508 is coupled with the motor output shaft first portion 506A for rotation therewith. In an embodiment, the first gear 508 is forged on the motor output shaft first portion 506A. In other embodiments, the first gears 508 may be welded, splined, or press-fit to the motor output shaft first portion 506A. The electric motor 504 selectively drives a compound idler assembly 512 via the motor output shaft first portion 506A and the first gear 508. In an embodiment, the motor output shaft first portion 506A, the compound idler assembly 512, and axle shafts 16, 18 are disposed offset and parallel relative to one another.

The compound idler assembly 512 comprises an idler shaft 514 rotatably supported in an axle housing (not depicted) via first and second bearings 516A, 516B. A third gear 524 is disposed concentrically about at least a portion of the idler shaft 514. The third gear 524 is in meshed engagement with the first gear 508 and receives torque therefrom when the electric motor 504 outputs torque to the motor output shaft 506. In an embodiment, the third gear 524 comprises the general geometry of a hollow right circular cylinder. The third gear 524 is part of a first clutch assembly 525. In an embodiment, the first clutch assembly 525 comprises a first clutch drum 526 disposed at least partially concentrically within the third gear 524. A radially outer surface of the first clutch drum 526 is coupled with a radially inner surface of the third gear 524. In an embodiment, the first clutch drum 526 and the third gear 524 may be coupled via splined engagement. In another embodiment, the first clutch drum 526 and the third gear 524 may be coupled via an interference fit. In yet another embodiment, the third gear 524 and the clutch drum 526 may comprise a unitary component.

A first clutch hub 528 is disposed at least partially concentrically within the first clutch drum 526. The first clutch hub 528 is coupled for rotation with the idler shaft 514. In an embodiment, the first clutch hub 528 may comprise a splined radially inner surface in meshed engagement with complimentary splines on the idler shaft 514. The third gear 524 is entirely supported on the idler shaft 514 by the first clutch hub 528 via the first clutch drum 526.

A first plurality of clutch plates 534 are coupled for rotation with the first clutch drum 526. The clutch plates 534 receive torque from the first clutch drum 526 and may move axially within the first clutch drum 526. A second plurality of clutch plates 544 are in meshed engagement with the first clutch hub 528. The second plurality of clutch plates 544 are interleaved with the first plurality of clutch plates 534. The second plurality of clutch plates 544 may move axially along the first clutch hub 528.

A fourth gear 584 is coupled for rotation with the idler shaft 514. The fourth gear 584 is in meshed engagement with a second gear 510 and selectively receives torque therefrom. The second gear 510 may be disposed about the motor output shaft second portion 506B. A second clutch 625 is disposed about the motor output shaft second portion 506B and coupled with the second gear 510. In an embodiment, the second gear 510 may be coupled with a second clutch drum 626 disposed about the motor output shaft second portion 506B. The second clutch drum 626 is supported on the motor output shaft second portion 506B via a bearing 627 for selective rotation relative to the motor output shaft first and seconds portions 506A, 506B. The motor output shaft first and second portions 506A, 506B are unitary and integral.

In an embodiment, a second clutch hub 628 is disposed at least partially concentrically within the second clutch drum 626. The second clutch hub 628 is coupled for rotation with the motor output shaft second portion 506B. In an embodiment, the second clutch hub 628 may comprise a splined radially inner surface in meshed engagement with complimentary splines on the motor output shaft second portion 506B. In another embodiment, the second clutch hub 628 may be formed unitary and integral with the motor output shaft second portion 506B.

A first plurality of clutch plates 634 are coupled for rotation with the second clutch drum 626. The clutch plates 634 receive torque from the second clutch drum 626 and may move axially within the second clutch drum 626. In an embodiment, a second plurality of clutch plates 644 are in meshed engagement with the second clutch hub 628. In another embodiment, the second plurality of clutch plates 644 may be in meshed engagement directly with the motor output shaft second portion 506B. The second plurality of clutch plates 644 are interleaved with the first plurality of clutch plates 634. The second plurality of clutch plates 644 may move axially along the second clutch hub 628.

In an embodiment, the motor output shaft second portion 506B comprises a fluid conduit 646 disposed at least partially axially therethrough. Apertures in the motor output shaft second portion 506B facilitate fluid communication between the fluid conduit 646 and the second clutch 625. A hydraulic actuator (not depicted) may be in fluid communication with the fluid conduit 646. The hydraulic actuator utilizes pressurized fluid to actuate a piston member 670 disposed within the second clutch drum 626. The piston member 670 is sealed within the second clutch drum 626, and the hydraulic actuator thereby applies an axial load to the first and second pluralities of clutch plates 634, 644 to transfer torque from the motor output shaft first portion and second portion 506A, 506B to the second clutch drum 626 and the second gear 510. A biasing member (not depicted) is also disposed within the second clutch drum 626, and decompresses to actuate the piston member 670 and evacuate the pressurized fluid from the second clutch drum 626 when the second clutch 625 is disengaged. A clutch drum cover portion 671 may be coupled with the motor output shaft first portion 506A. The cover portion 671 may be sealing coupled with a radially inner surface of the second clutch drum 626 and rotate relative to the second clutch drum 626 when the second clutch 625 is disengaged. In an embodiment, the first clutch 525 may comprise substantially the same components described with regard to the first clutch 125, and may be selectively engaged/disengaged via the hydraulic actuator.

A fifth gear 586 is coupled with the idler shaft 514. In an embodiment, the fifth gear 586 may be forged on the idler shaft 514. The fifth gear 586 is in meshed engagement with the differential mechanism 400 described supra via the sixth gear 188.

Figure 15:
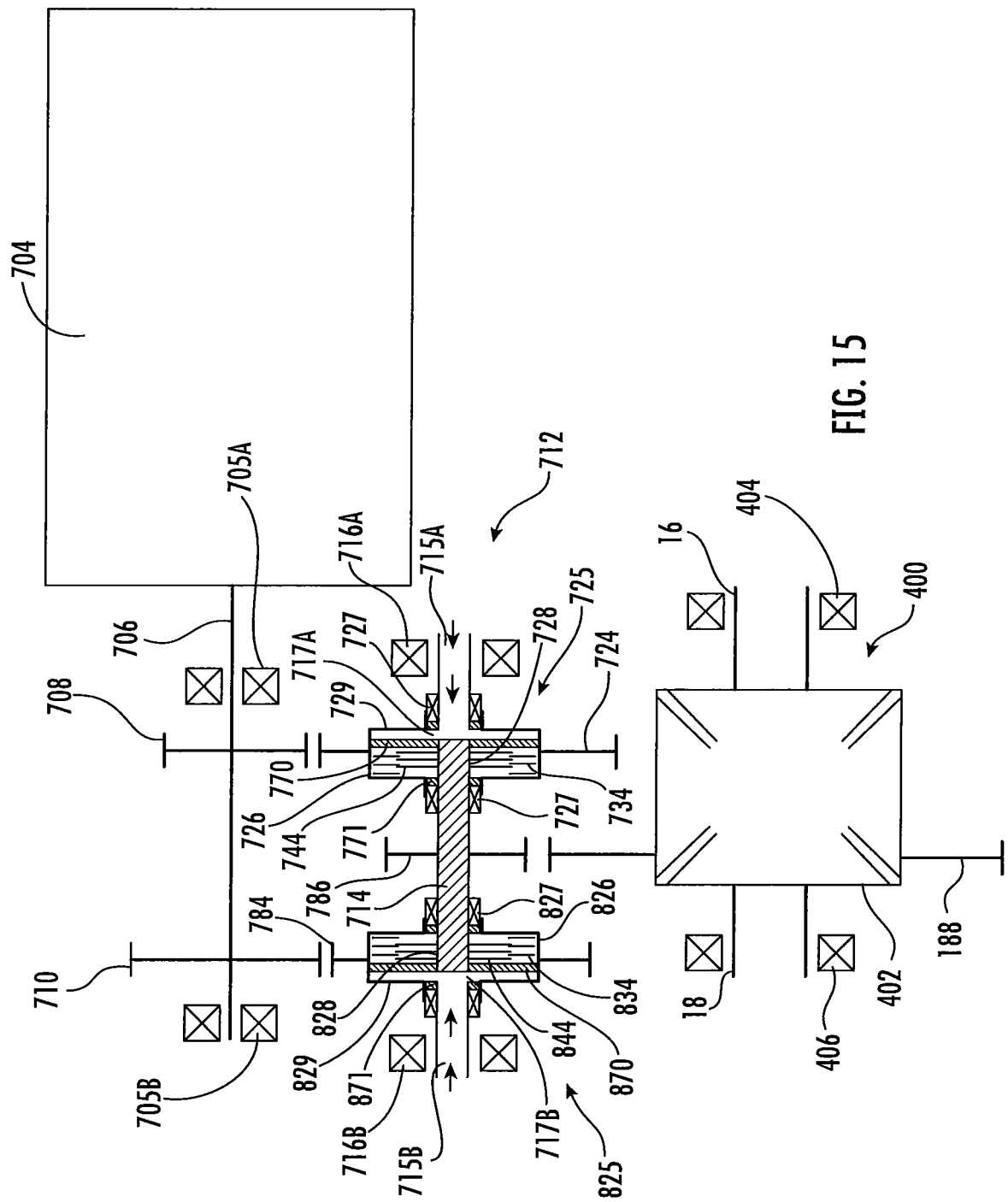
FIG. 15 illustrates a schematic diagram of an electric axle according to another embodiment of the presently disclosed subject matter.

In another embodiment, as illustrated in FIG. 15, an electric drive axle 700 may comprise an electric motor 704 coupled with a power source (not depicted). The electric motor 704 may be a permanent magnet synchronous machine comprising a stator (not depicted) disposed concentrically about a rotor (not depicted). A motor output shaft 706 is rotatably disposed within a housing (not depicted) via a first bearing 705A and a second bearing 705B. The motor output shaft 706 is coupled with the rotor of the electric motor 704 for rotation therewith. A first gear 708 and a second gear 710 may be coupled with the motor output shaft first 706 for rotation therewith. In an embodiment, the first and second gears 708, 710 may be forged on the motor output shaft 706. In other embodiments, the first and second gears 708, 710 may be welded, splined, or press-fit to the motor output shaft 706. The electric motor 704 drives a compound idler assembly 712 via the motor output shaft 706 and the first or second gear 708, 710. In an embodiment, the motor output shaft 706, the compound idler assembly 712, and axle shafts 16, 18 are disposed offset and parallel relative to one another.

The compound idler assembly 712 comprises an idler shaft 714 rotatably supported in an axle housing (not depicted) via first and second bearings 716A, 716B. A third gear 724 is disposed concentrically about at least a portion of the idler shaft 714. The third gear 724 is in meshed engagement with the first gear 708 and receives torque therefrom when the electric motor 704 outputs torque to the motor output shaft 706. In an embodiment, the third gear 724 comprises the general geometry of a hollow right circular cylinder. The third gear 724 is part of a first clutch assembly 725. In an embodiment, the first clutch assembly 725 comprises a first clutch drum 726 disposed at least partially concentrically within the third gear 724. A radially outer surface of the first clutch drum 726 is coupled with a radially inner surface of the third gear 724. In an embodiment, the first clutch drum 726 and the third gear 724 may be coupled via splined engagement. In another embodiment, the first clutch drum 726 and the third gear 724 may be coupled via an interference fit. In yet another embodiment, the third gear 724 and the clutch drum 726 may comprise a unitary component. The first clutch drum 726 may be rotatably supported on the intermediate shaft 714 via a pair of bearings 727.

A first clutch hub 728 may be disposed at least partially concentrically within the first clutch drum 726. The first clutch hub 728 is coupled for rotation with the idler shaft 714. In an embodiment, the first clutch hub 728 may comprise a splined radially inner surface in meshed engagement with complimentary splines on the idler shaft 714. The third gear 524 may be supported on the idler shaft 714 by the first clutch hub 728 via the first clutch drum 726.

A first plurality of clutch plates 734 are coupled for rotation with the first clutch drum 726. The clutch plates 734 receive torque from the first clutch drum 726 and may move axially within the first clutch drum 726. A second plurality of clutch plates 744 are in meshed engagement with the first clutch hub 728. The second plurality of clutch plates 744 are interleaved with the first plurality of clutch plates 734. The second plurality of clutch plates 744 may move axially along the first clutch hub 728. In an embodiment, the second plurality of clutch plates 744 may be splined directly to the idler shaft 714. Additionally, a piston member 770 may be disposed within the first clutch drum 726. The piston member 770 and the clutch plates 734, 744 may be sealed within the first clutch drum 726 via seals 771 and a clutch drum cover 729.

A fourth gear 784 is at least partially disposed about the idler shaft 714. The fourth gear 784 is in meshed engagement with a second gear 710 and receives torque therefrom. The fourth gear 784 is part of a second clutch assembly 825. In an embodiment, the second clutch assembly 825 comprises a second clutch drum 826 disposed at least partially concentrically within the third gear 824. A radially outer surface of the first clutch drum 826 is coupled with a radially inner surface of the third gear 824. In an embodiment, the first clutch drum 826 and the third gear 824 may be coupled via splined engagement. In another embodiment, the first clutch drum 826 and the third gear 824 may be coupled via an interference fit. In yet another embodiment, the third gear 824 and the clutch drum 826 may comprise a unitary component. The first clutch drum 826 may be rotatably supported on the intermediate shaft 814 via a pair of bearings 827.

A second clutch hub 828 may be disposed at least partially concentrically within the first clutch drum 826. The second clutch hub 828 is coupled for rotation with the idler shaft 714. In an embodiment, the second clutch hub 828 may comprise a splined radially inner surface in meshed engagement with complimentary splines on the idler shaft 714. The fourth gear 784 may be supported on the idler shaft 714 by the second clutch hub 828 via the second clutch drum 826.

A first plurality of clutch plates 834 are coupled for rotation with the second clutch drum 826. The clutch plates 834 receive torque from the second clutch drum 826 and may move axially within the second clutch drum 826. A second plurality of clutch plates 844 are in meshed engagement with the second clutch hub 828. The second plurality of clutch plates 844 are interleaved with the first plurality of clutch plates 834. The second plurality of clutch plates 844 may move axially along the second clutch hub 828. In an embodiment, the second plurality of clutch plates 844 may be splined directly to the idler shaft 714. Additionally, a piston member 870 may be disposed within the second clutch drum 826. The piston member 870 and the clutch plates 834, 844 may be sealed within the second clutch drum 826 via seals 871 and a clutch drum cover 829.

In an embodiment, the idler shaft 714 may comprise first and second fluid conduits 715A, 715B disposed in the ends thereof. The first and second fluid conduits 715A, 715B may be disposed coaxially with the idler shaft 714. Apertures 717A, 717B may be disposed radially through the idler shaft 714, placing the first and second fluid conduits 715A, 715B in fluid communication with the interior of the first and second clutches 725, 825, respectively.

A hydraulic actuator (not depicted) may be in fluid communication with the first and second fluid conduits 715A, 715B. The hydraulic actuator utilizes pressurized fluid to actuate selectively actuate the piston members 770, 870. A biasing member (not depicted) is also disposed within each of the first and second clutch drums 726, 826. The biasing member decompresses to actuate the piston members 770, 870 and evacuate the pressurized fluid from the first and second clutch drums 726, 826 when the first and second clutches 725, 825 are disengaged, respectively.

A fifth gear 786 is coupled with the idler shaft 714. In an embodiment, the fifth gear 786 may be forged on the idler shaft 714. The fifth gear 786 may be disposed axially between the first and second clutches 725, 825. The fifth gear 786 is in meshed engagement with the differential mechanism 400, described supra, via the sixth gear 188.

During operation, either the first clutch 725 or the second clutch 825 is engaged at one time to select a desired gear ratio, and transfer torque from the motor output shaft 706 to the idler shaft 714, and from the idler shaft 714 to the differential mechanism 400. However, both the first and second clutches 725, 825 may be engaged simultaneously to act as a parking brake.

One or more features of the embodiments described supra may be combined to create additional embodiments which are not depicted. While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An electric drive axle, comprising:
an electric motor-generator;
a motor-generator output shaft;
an idler shaft;
a gear train including:
   a first gear coupled directly to the motor-generator output shaft;
   a second gear directly or selectively coupled to the motor-generator output shaft;
   a third gear selectively coupled to the idler shaft;
   a fourth gear directly or selectively coupled to the idler shaft; and
   a fifth gear coupled to the idler shaft and coupled to a differential case;
a first clutch assembly including a first clutch drum disposed at least partially concentrically within the third gear; and
a second clutch assembly including a second clutch drum disposed at least partially concentrically within the second gear;
a first fluid conduit disposed at least partially through the idler shaft and in fluid communication with a first hydraulic actuator in the first clutch assembly; and
a second fluid conduit disposed at least partially through the motor-generator output shaft and in fluid communication with a second hydraulic actuator in the second clutch assembly.

2. The electric drive axle of claim 1, wherein the first fluid conduit extends through an end of the motor-generator output shaft that is spaced away from the electric motor-generator.

3. The electric drive axle of claim 1, wherein the idler shaft is supported by a housing.

4. The electric drive axle of claim 1, wherein the electric motor-generator is a permanent magnet synchronous motor-generator.

5. The electric drive axle of claim 1, further comprising a first radial needle bearing coupled to the first clutch drum and a second radial needle bearing coupled to the second clutch drum.

6. The electric drive axle of claim 1, further comprising a first thrust bearing and a second thrust bearing coupled to opposing sides of the idler shaft.

7. The electric drive axle of claim 1, wherein the first clutch drum is in splined engagement with the third gear.

8. The electric drive axle of claim 1, wherein the first clutch drum and the third gear are interference fit.

9. The electric drive axle of claim 1, wherein the first clutch drum and the third gear form a unitary component.

10. The electric drive axle of claim 1, wherein the first and second clutch assemblies are designed to be engaged simultaneously in a parking brake mode.

11. An electric drive system, comprising:
an electric motor-generator;
a motor-generator output shaft rotationally coupled to the electric motor-generator;

an idler shaft;

a gear train including a plurality of gears coupled to the motor-generator output shaft and the idler shaft;

a first clutch assembly including a first clutch drum that is disposed at least partially concentrically within a first gear on the idler shaft;

a second clutch assembly including a second clutch drum that is disposed at least partially concentrically within a second gear on the idler shaft;

a first fluid conduit disposed at least partially through the idler shaft and in fluid communication with the first clutch assembly; and a second fluid conduit disposed at least partially through the idler shaft and in fluid communication with the second clutch assembly;

wherein the first and second fluid conduits are positioned at opposing ends of the idler shaft.

12. The electric drive system of claim 11, wherein:
the first fluid conduit is in fluidic communication with a first piston member in the first clutch assembly; and
the second fluid conduit is in fluidic communication with a second piston member in the second clutch assembly.

13. The electric drive system of claim 11, wherein the first clutch drum is in splined engagement or interference fit with the first gear.

14. The electric drive system of claim 11, wherein the first fluid conduit and the second fluid conduit are in hydraulic communication with a hydraulic actuator assembly.

15. The electric drive system of claim 11, further comprising:
a first needle bearing coupled to the first clutch drum and a second needle bearing coupled to the second clutch drum; and
a first thrust bearing and a second thrust bearing coupled to opposing sides of the idler shaft.

16. The electric drive system of claim 15, wherein the first and second thrust bearings are positioned axially outboard of the first and second needle bearings with regard to the idler shaft.

17. The electric drive system of claim 11, further comprising a third gear coupled to the idler shaft and a differential case and wherein the idler shaft and the differential case are rotatably supported by a housing.

18. The electric drive system of claim 11, wherein:
the first clutch assembly includes a plurality of plates moving axially along a first clutch hub during actuation; and
the second clutch assembly includes a plurality of plates moving axially along a second clutch hub during actuation.

19. The electric drive system of claim 11, wherein:
in a first mode, the first and second clutch assemblies are designed to engage one at a time to select a desired gear ratio; and
in a second mode, the first and second clutch assemblies are designed to simultaneously engage.

* * * * *